(12) United States Patent
Nolte et al.

(10) Patent No.: US 6,671,682 B1
(45) Date of Patent: Dec. 30, 2003

(54) METHOD AND SYSTEM FOR PERFORMING TASKS ON A COMPUTER NETWORK USING USER PERSONAS

(75) Inventors: Diana Brown Nolte, Sugar Grove, IL (US); Suzanne Kennedy Rajchel, Wheaton, IL (US)

(73) Assignee: Lucent Technologies, Murray Hill, NJ (US)

(*) Notice: Subject to any disclaimer, the term of this patent is extended or adjusted under 35 U.S.C. 154(b) by 272 days.

(21) Appl. No.: 09/627,990

(22) Filed: Jul. 28, 2000

(51) Int. Cl.[7] .............................................. G06F 17/30
(52) U.S. Cl. ............................ 707/5; 707/2; 707/10; 707/102
(58) Field of Search ...................... 725/116; 709/224, 709/217, 203, 232; 707/3, 4, 100, 102, 5, 6, 2; 345/775

(56) References Cited

U.S. PATENT DOCUMENTS 5,754,938 A * 5/1998 Herz et al. .................. 725/116
6,199,099 B1 * 3/2001 Gershman et al. ........... 709/203
6,421,675 B1 * 7/2002 Ryan et al. .................. 707/100
6,452,614 B1 * 9/2002 King et al. .................. 345/775
2002/0133500 A1 * 9/2002 Arlein et al. ................ 707/102

* cited by examiner

Primary Examiner—Kim Vu
Assistant Examiner—Gwen Liang

(57) ABSTRACT

A plurality of user personas relating to various criteria for performing tasks for a user is created. A policy manager for various criteria, which apply to the user regardless of any one persona among the plurality of personas, including sub-personas thereof is established. At least one user persona from among the plurality of user personas is selected. A computer network searching task based on the policy manager and the at least one user persona selected from among the plurality of user personas is performed. Results of the computer network searching task for the user in at least a two dimensional graphical representation are presented.

6 Claims, 5 Drawing Sheets

METHOD AND SYSTEM FOR PERFORMING TASKS ON A COMPUTER NETWORK USING USER PERSONAS

BACKGROUND OF THE INVENTION

The present invention relates generally to methods and systems for performing tasks, such as online shopping or searching, on a computer network, such as an intranet or the World Wide Web and, more particularly, to a method and system for performing tasks on a computer network using a unique user persona to improve the task results.

Current search engines generally are poor finders and presenters of desired information. Frequently, these search engines return thousands of "hits" in a long list of text items. Many of the items returned have little or no relevancy to the subject being searched and the needs of the searcher. At the other extreme, search engines provide no "hits" for certain searches.

Many millions of information items are available through the Internet and, it is expected to grow into the billions of information items in the next few years. The number of information, shopping and other service sites available on the Internet has also grown exponentially. This wealth of information and services presents a substantial obstacle to user attempting to find a specific piece of information. A user who doesn't know where to look or how to conduct the proper search to find the information has an even bigger obstacle. Search engines are generally of little assistance, since current search engines and service tools do not take into consideration specific needs and characteristics of the individual user doing the searching or requesting the service.

Accordingly, there is a need in the art for a method and system for performing tasks on a computer network, such as the Internet, which compiles a unique and effective user profile and which uses the user profile with an intelligent personal agent to perform personalized and targeted tasks, which permits the user to more accurately target and retrieve the most relevant information relating to the task at hand.

SUMMARY OF THE INVENTION

This need is met by a method and system in accordance with the present invention wherein unique personas store information regarding a user and one or more of the personas are used to perform a task, such as searching, on a computer network in an efficient manner.

In accordance with one aspect of the present invention, a method for performing a task on a computer network, such as the Internet, is provided. A persona is developed containing attributes, such as age, language(s), address, marital status and the like, of a user. The task is then performed based on the persona. Preferably, results of the task, or search, are filtered based on the persona. Information in the persona may be supplied by gathering information regarding the user from the computer network. Alternatively, or in addition to, the user may be queried for information. The query may be performed by a software product automatically presenting a set of queries to the user.

To provide an even more tailored task, the persona may consist of a core persona containing basic information regarding the user and one or more sub-personas containing more specific information, such as hobbies of the user, regarding the user. The personas may be updated by monitoring activities of the user on the computer network and modifying the personas based on the activities.

In accordance with another aspect of the present invention, a method is provided for performing tasks on a computer network. The method comprises the steps of creating a plurality of user personas containing information regarding attributes of a user; defining policies in a policy manager relating to various criteria for performing tasks for the user; selecting one of the user personas; and performing the task based on the selected one of the user personas and the policy manager. For a search of the computer network, the search results may be presented in a three dimensional form or in categories based on credibility. A default persona may be defined as one of the user personas. The default persona is then selected if no other user persona is selected.

In accordance with yet another aspect of the present invention, a system is provided for performing tasks on a computer network. The system consists of a user persona for storing attributes of a user. A task execution agent performs tasks on the computer network based on the user persona. A pre-collection agent may collect information for the user persona from information available on the computer network. An interview agent may query the user for information to be placed in the user persona. Additionally, a learning agent may monitor activity of the user on the computer network and modify information stored in the user persona based on the activity.

BRIEF DESCRIPTION OF THE DRAWINGS

The foregoing and other advantages of the invention will become apparent upon reading the following detailed description and upon reference to the drawings in which.

DETAILED DESCRIPTION OF THE INVENTION

Figure 1:
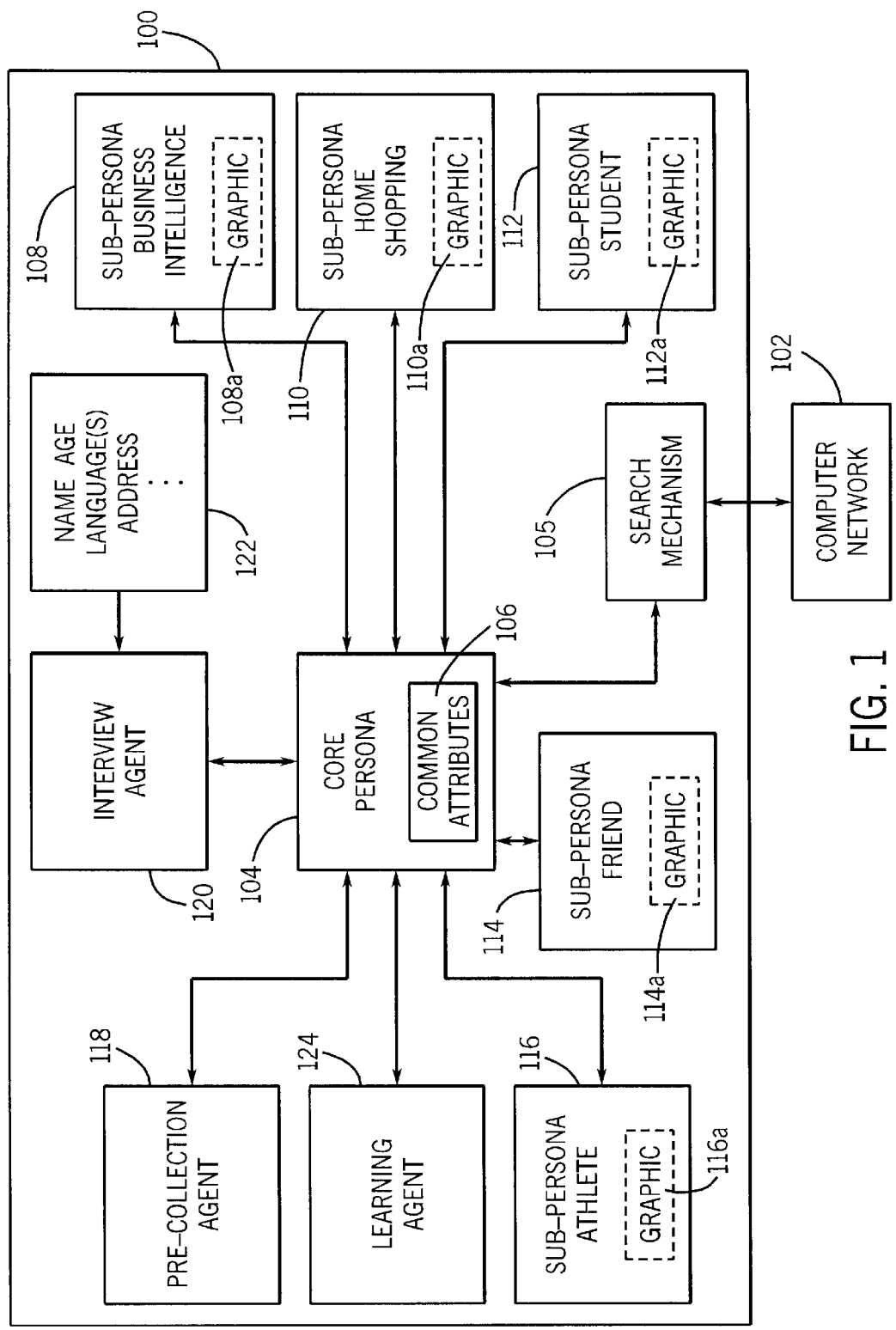
FIG. 1 is block diagram of a system in accordance with the present invention which uses one or more personas to perform tasks on a computer network.

In accordance with an aspect of the present invention, a method and system for searching a computer network, such as the Internet or World Wide Web (WWW), is provided. The present invention provides for more focused tasks, such as online shopping and searches, and better presentation of task results for the user. In particular, the present invention provides an unique and effective means of compiling a user profile and using the user profile in combination with intelligent personal agent software to perform personalized and targeted tasks.

In accordance with the present invention, a system 100, which may be a computer or a network of computers, is connected to a computer network 102. The computer network 102 may be an intranet or the Internet or any other type of computer network which stores information. It should also be understood that the system 100 may be comprised of one or more computer devices. In order to make searching the computer network 102 more efficient and tailored to a user, a core persona 104 is created for the user which contains information regarding the user. A task execution agent, or search mechanism 105, performs the task, or search, of the computer network 102 based on information contained in the core persona 104 as described more fully below.

The core persona 104 contains common attributes 106 concerning the user which will be used to perform tasks. The common attributes 106 may be shared with more specific sub-personas for various attributes of the user. For example, a business intelligence sub-persona 108 may be established for the user which has attributes related to searching for competitors to the user's business endeavors. A home shopping sub-persona 110 may be established which contains information truly germane to the user's shopping habits for home items. A student sub-persona 112 may be set up for the user which contains information relating to the user's studies or education. A friend sub-persona 114 may contain information concerning the user's interaction with friends over the computer network 102. An athlete sub-persona 116 may contain information, or attributes, relating to the user's sporting interests. Each of the sub-personas 108, 110, 112, 114 and 116 may have a corresponding graphic 108a, 110a, 112a, 114a and 116a associated therewith.

As will be discussed more fully below, a pre-collection agent 118 may be employed to search the computer network 102 to obtain information on the user which may then be stored in the core persona 104 or any of the sub-personas 108, 110, 112, 114 or 116. When used on the WWW, the pre-collection agent 118 collects information available to the public on the user. The user could use this pre-collected information to become aware of what information exists about the user in the public domain and/or correct or take action to have the information removed.

An interview agent 120 is provided which may substantially automatically request information from the user and store the user's responses in the in the core persona 104 or any of the sub-personas 108, 110, 112, 114 or 116. The interview agent 120 may request personal data 122, such as name, age, language(s), address, marital status, number of children, financial data, abilities, clothing sizes and measurements, interests, hobbies, profession, personal tastes and the like. Preferably, the interview agent 120 interactively interviews the user, in either a text-driven format, an audio-driven format, a video-driven format or any appropriate formats. An example of such an interactive interview product is contained in Turbo Tax Deluxe software produced by Intuit Inc. of Mountain View, Calif. The personas may include user-specified privacy attributes, such as what information may be disclosed to whom, masking of identity and behavior history.

For further modification and refinement of the information in the core persona 104 and the sub-personas 108, 110, 112, 114 and 116, a learning agent 124 may be provided which tracks the user's use of the computer network 102 and may periodically add, change, delete or update the information based on the user's actual use, or responses to various tasks. Some exemplary methods in accordance with the present invention for learning may include queries to the user about "Hot vs. Cold" regarding search results, information collected about frequently used information sources and/or source types (.gov, .org, .com and the like), learning styles and preferred presentation mechanisms (visual or textual) and history of "click trail".

Figure 2:
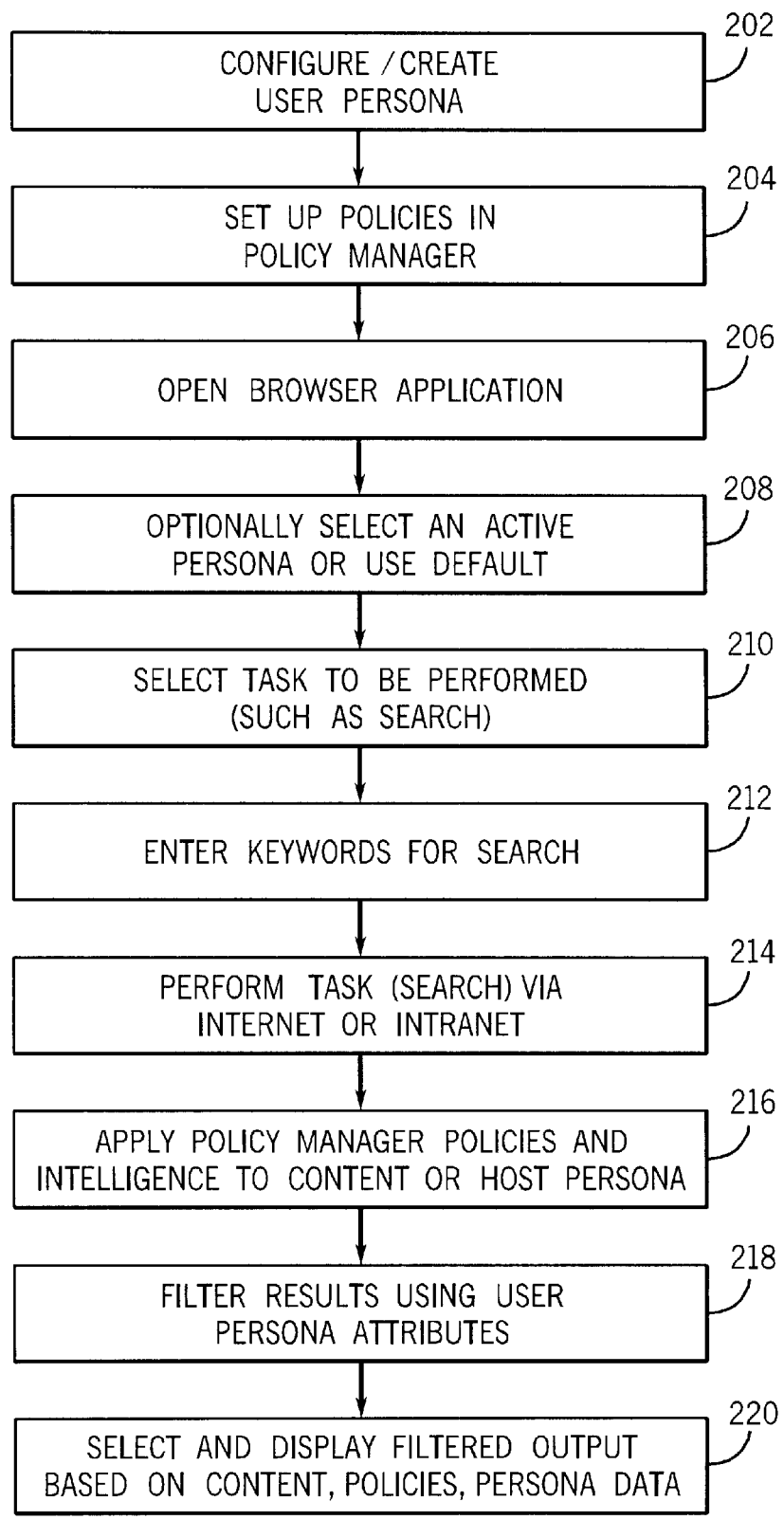
FIG. 2 is a flowchart of a method for performing tasks on a computer network using one or more personas in accordance with the present invention.
Figure 3:
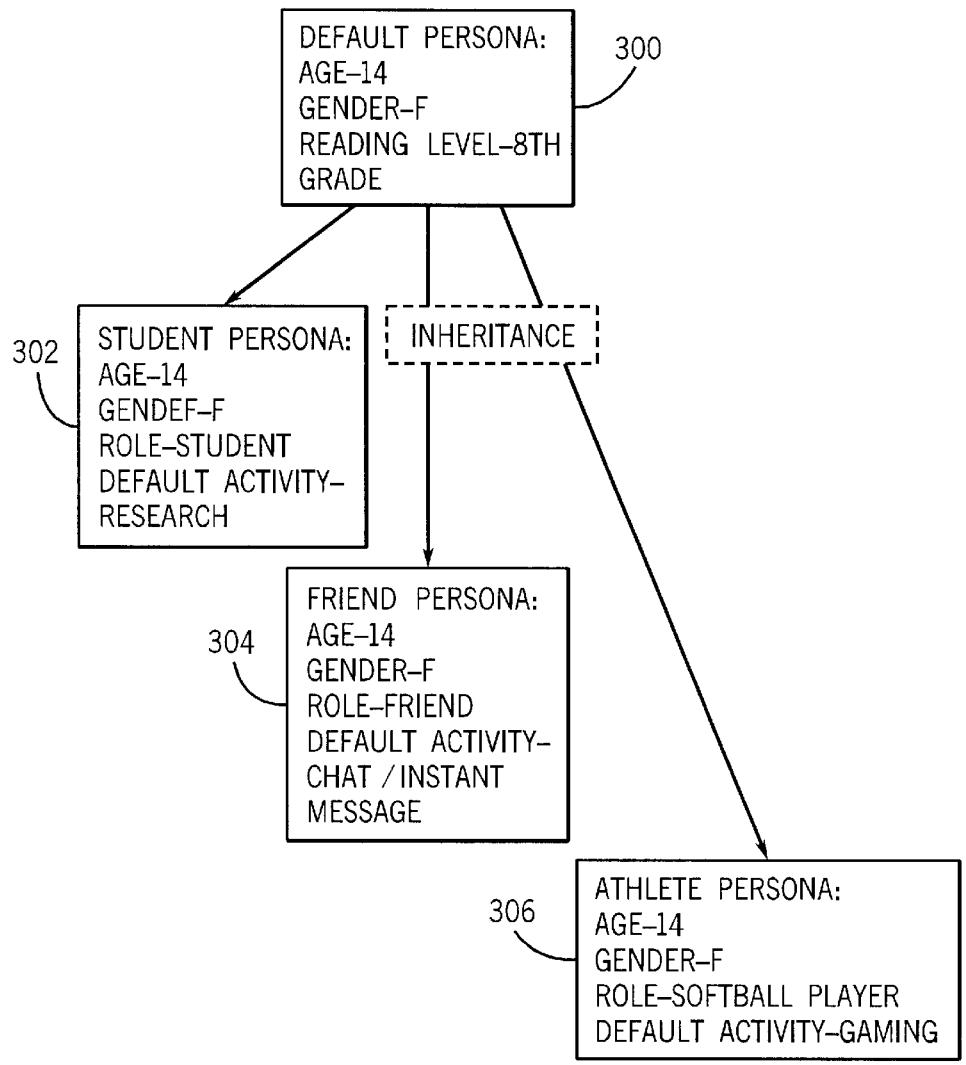
FIG. 3 shows exemplary contents of a plurality of personas.

In accordance with an aspect of the present invention, a method for performing tasks is shown in FIG. 2. In step 202, a user persona is configured or created. The user persona may be the core persona 104 or any of the sub-personas 108, 110, 112, 114 and 116. An exemplary core, or default persona 300 and corresponding student, friend and athlete personas 302, 304 and 306 are shown in FIG. 3. As shown the default persona 300 contains core information which is likely relevant to each sub-persona. The default persona 300 is shown containing age of "14", gender of "F" and reading level of "$8^{th}$ grade". The student persona 302 receives age and gender information from the default persona 300 and also contains a role of the user as "student" and a default activity of "research". The default activity indicates one or more tasks that the user would likely be performing while using the particular persona. The friend persona 304 includes age, gender, a role of "friend" and a default activity of "chat/instant message". The athlete persona 306 includes age, gender, a role of "softball player" and a default activity of "gaming". As noted, the information contained in the various personas may be obtained through the pre-collection agent 118 or the interview agent 120.

Figure 4:
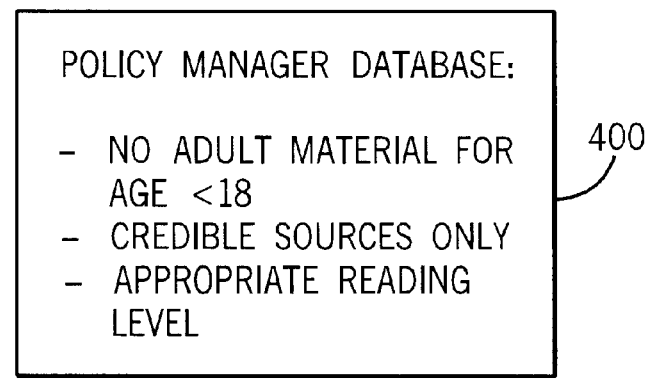
FIG. 4 shows exemplary contents of a policy manager database in accordance with the present invention.

In step 204, policies are set up in a policy manager. An exemplary policy manager 400 is shown in FIG. 4. The policy manager 400, or policy manager database, establishes various criteria which apply for a particular user regardless of the persona, or sub-persona being used. The policy manager 400, for example, prohibits adult material for users under eighteen years of age, requires credible sources and requires an appropriate reading level.

A browser application, such as Netscape or Internet Explorer, is opened in step 206. In step 208, an active persona, or sub-persona, is selected or if none is selected, a default persona can be used. A task to be performed, such as searching, shopping or the like, is optionally selected in step 210. Alternatively, a default task defined by the default persona may be automatically performed. If a search is selected, for example, keywords for the search are entered in step 212. The task is then performed over the proper computer network, such as the Internet or an intranet at step 214. A software process, designated a personal agent process, executes WWW-based tasks using data from the selected persona and the task request of the user. The tasks may also reflect information such as urgency, time of day, day of week, mood of the user or task definition (size, subject, goal, "customer").

Figure 5:
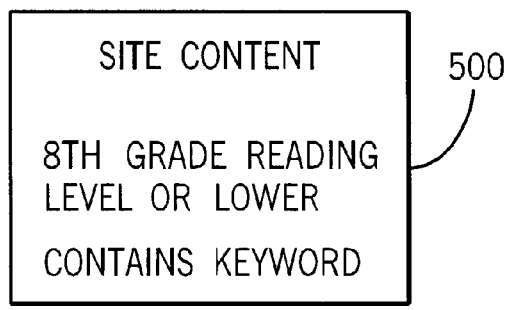
FIG. 5 shows exemplary site content criteria.
Figure 6:
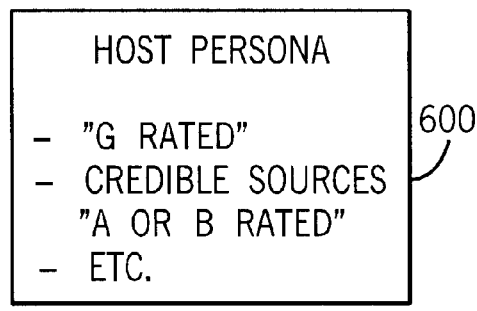
FIG. 6 shows exemplary host persona criteria.

The personal agent process applies policies in the policy manager 400 which are used to filter what is returned from the search at step 216 or which may be applied to a host persona. An exemplary site content 500 criteria is shown in FIG. 5. The content 500 requires that information contained in the search results be at an $8^{th}$ grade reading level or lower and contains the desired keywords. A host persona 600 is shown in FIG. 6. The personal agent process requires that the information in the search results be "G" rated and from a credible source. The search results are filtered using specific user persona attributes and policies in step 218. In step 220, the remaining information, or search results, is sorted and displayed based on content, policies and persona data.

The processes, and agents and personas disclosed herein may be implemented on the user's computer or other computer remote from the user.

Figure 7:
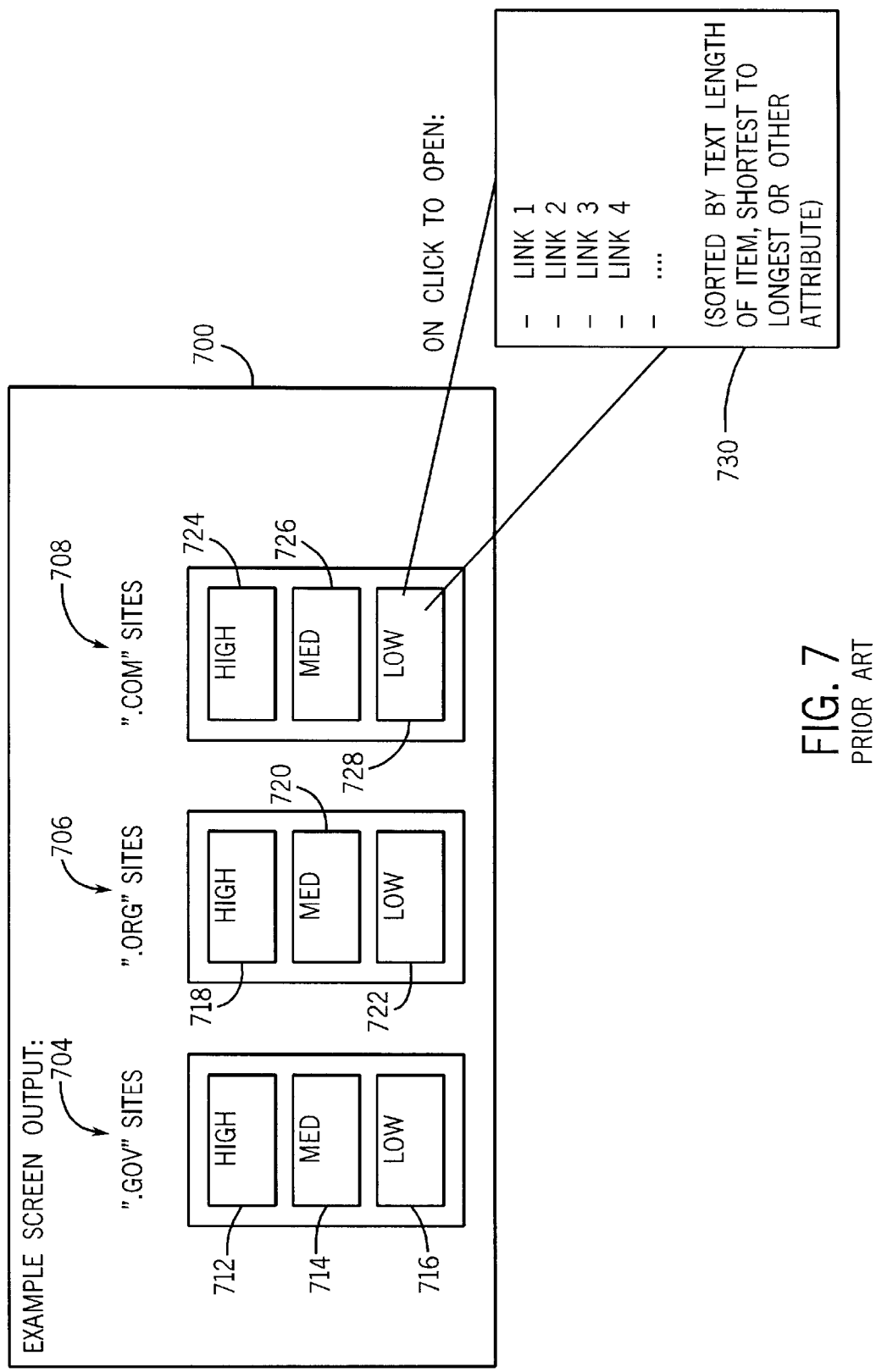
FIG. 7 is an exemplary screen output in accordance with the present invention.

An exemplary output screen 700 is shown in FIG. 7. The results are organized by site extension groups, such as ".gov" sites 704, ".org" sites 706 and ".com" sites 708. Each of the site extension groups 704, 706 and 708 are further divided by source credibility. In particular, group 704 is divided into a high credibility category 712, a medium credibility category 714 and a low credibility category 716. Group 706 is divided into a high credibility category 718, a medium credibility category 720 and a low credibility category 722. Similarly, group 708 is divided into a high credibility category 724, a medium credibility category 726 and a low credibility category 728. The various categories 712–728 may be shown as filed drawers or other representative graphic for ease of use.

As shown in an enlarged section 730 of FIG. 7, each of the categories 712, 714, 716, 718, 720, 722, 724, 726 and 728 are linked to a list of links, such as Link1, Link2, Link3, Link4 which are displayed when a category is selected. The links may be displayed in an order determined by any number of factors, such as text length or other attribute.

The present invention may be implemented in conjunction with a novel method operating within a computer internetwork, such as the Internet, in which a set of information attributes or characteristics are stored at a web site computer. For this disclosure, this information is designated as meta-data. The meta-data may pertain to content included in the site, context tags about the site, the source of the web site, sources of the sources of the site, the relationship of the site to other sites, and subjective attributes of the site. The meta-data may be stored in a file called a "host profile" or "host persona". The host profile can be stored either local to the web site or remote from it, and is transferred to a search engine via standard accepted methods, such as HTTP or XML, upon request.

Some data that could be included in the host profile may include attributes of the web site, such as size, complexity, source, subject and type. Characteristics of the site, such as government, education, individual, commercial and the like, may also be in the host profile. Business attributes of the site may be included, for example, geographic location, size, type of corporation (manufacturing vs. service business), SIC code and the like. In addition, a rating of source credibility/quality by the site or a third party, such as Consumer Union, Good Housekeeping and the like, may be provided.

The data in the host profile may be combined or processed by a search engine host processor with other data, such as keyword searches, to present relevant and meaningful output to the user. In addition, profiles of dependent web pages may adopt the host profile, or portions thereof, of its "parent" web page. Thus, a single content page within a web site can have its own profile but can also inherit attributes of the pages above it in the web site hierarchy. A search engine and/or personal agent process or other software process may then request and retrieve the child profile, the parent profile or both.

The results of a search using the present invention may be presented to a user in many different ways. For example, audio, text or visual presentation may be used. The results may be displayed to the user in a three dimensional (3D) representation. Such a 3D representation may incorporate "mountains" to represent search "hits" by a particular attribute type, in addition to keyword frequency. Thus, one mountain would represent pages containing keyword(s) that originated from an ".edu" site and the height of the mountain represents the frequency of "hits" on the keyword(s). A user could then "zoom in" on a particular area of the search display to view in more detail a set of search outputs closest to the most desired or most relevant attribute. Additional 3D visual outputs may include a community main street, file cabinets, ocean, library, a store with shelves or a shopping mall.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method for performing tasks on a computer network, said method comprising the steps of:

creating a plurality of user personas relating to various criteria for performing tasks for a user;

establishing a policy manager for various criteria, which apply to said user regardless of any one persona among said plurality of personas, including sub-personas thereof;

selecting at least one user persona from among said plurality of user personas;

performing a computer network searching task based on said policy manager and said at least one user persona selected from among said plurality of user personas; and presenting results of said computer network searching task for said user in at least a two dimensional graphical representation.

2. The method as recited in claim 1 wherein the step of performing comprises the step of:

searching the computer network for one or more keywords.

3. The method as recited in claim 2 wherein the step of performing comprises the step of:

presenting results of said computer network searching task, in response to performing said computer network searching task based on said policy manager and said at least one user persona selected from among said plurality of user personas.

4. The method as recited in claim 3 wherein said at least a two dimensional graphical representation comprises a three-dimensional graphical representation.

5. The method as recited in claim 1 wherein the step of presenting comprises the step of:

presenting the results in categories based on credibility of results.

6. The method as recited in claim 1 wherein the step of selecting comprises the step of:

defining a default persona as one of the user personas; and selecting the default persona if no other user persona is selected.

* * * * *